United States Patent [19]

Guenther

[11] Patent Number: 5,245,625
[45] Date of Patent: Sep. 14, 1993

[54] HIGH-FREQUENCY-EXCITED LASER FOR HIGH OUTPUT POWERS, PARTICULARLY A $CO_2$ STRIPLINE LASER

[75] Inventor: Wolfgang Guenther, Munich, Fed. Rep. of Germany

[73] Assignee: Siemens Aktiengesellschaft, Munich

[21] Appl. No.: 903,500

[22] Filed: Jun. 24, 1992

[30] Foreign Application Priority Data

Jun. 27, 1991 [DE] Fed. Rep. of Germany ....... 4121306

[51] Int. Cl.$^5$ .............................................. H01S 3/097
[52] U.S. Cl. ....................................... 372/82; 372/61; 372/65
[58] Field of Search ........................ 372/82, 81, 61, 65, 372/87, 88, 83

[56] References Cited

U.S. PATENT DOCUMENTS

| | | | |
|---|---|---|---|
| 4,730,333 | 3/1988 | Butenuth | 372/87 |
| 4,939,738 | 7/1990 | Opower | 378/95 |

FOREIGN PATENT DOCUMENTS

| | | |
|---|---|---|
| 0477879 | 4/1992 | European Pat. Off. . |
| 3729053 | 3/1989 | Fed. Rep. of Germany . |
| 2060989 | 5/1981 | United Kingdom . |

OTHER PUBLICATIONS

"Radio frequency excited $CO_2$ waveguide Lasers", by R. L. Sinclair et al, American Institute of Physics, Review of Scientific Instruments, No. 10, Oct. 1984, pp. 1539-1541.

*Primary Examiner*—Léon Scott, Jr.
*Attorney, Agent, or Firm*—Hill, Steadman & Simpson

[57] ABSTRACT

High-frequency-excited laser for high input powers, particularly a $CO_2$ stripline laser. For supplying high-power high-frequency energy to a laser, a matching unit (2) for the impedance is integrated in the laser, whereby the matching unit (2) contains a L-C element, whereby the inductance L and the capacitance C are variable, whereby the inductance can be set on the basis of variation of the length of the voltaicly conductive parts of a high-frequency feed and of a high-frequency conductance, whereby the capacitor is constructed of an outer conductor (10) and of an inner conductor (3) coaxial thereto, and whereby a coaxial slide ring (27) externally movable in an axial direction is in communication with the outer conductor (10). The slide ring (27) adjoins a dielectric cylinder (28) between the outer conductor (10) and the inner conductor (3), the outer conductor (10) carrying the inner conductor (3). The high-frequency-excited laser is provided for $CO_2$ stripline lasers.

10 Claims, 1 Drawing Sheet

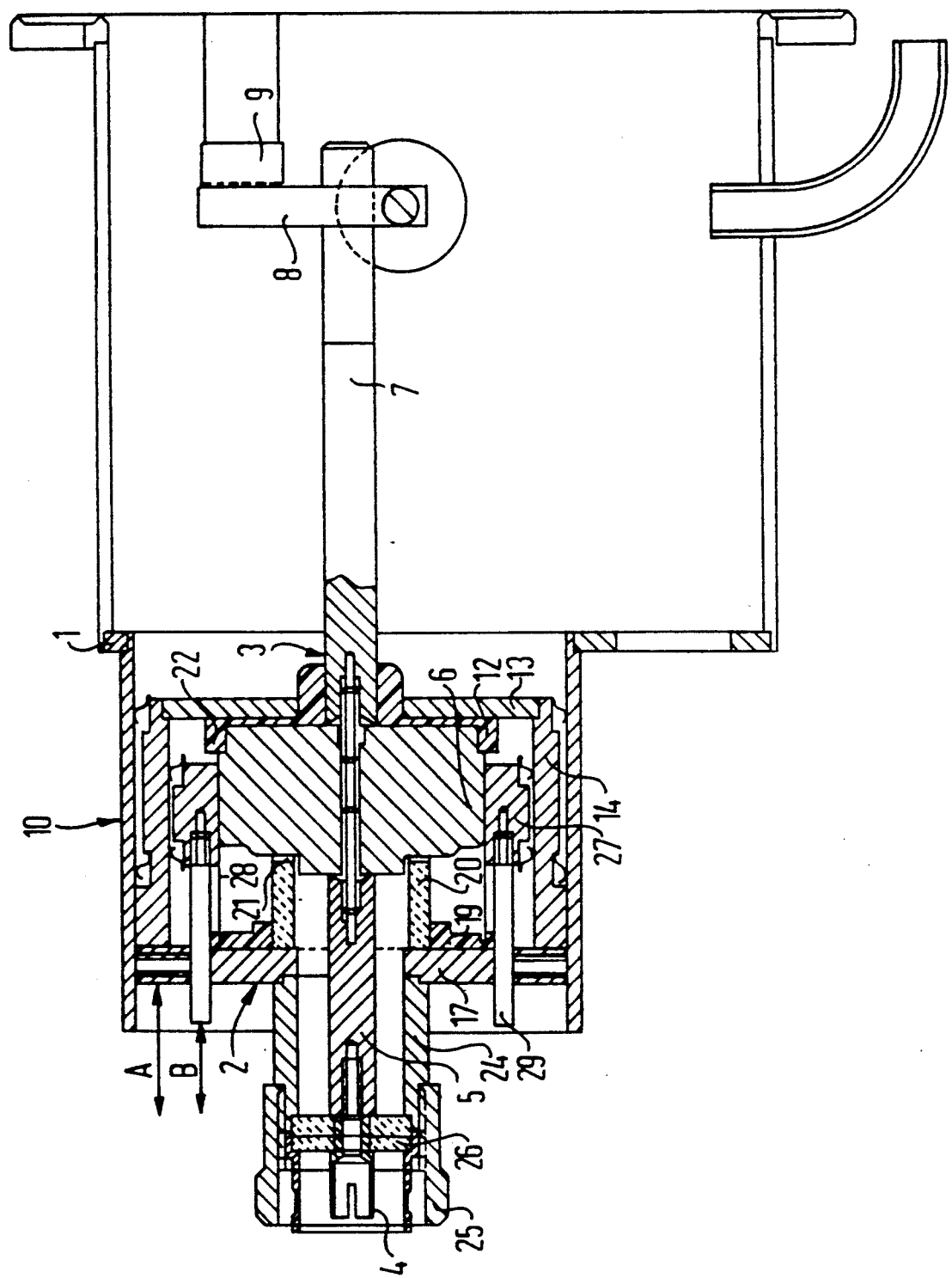

5,245,625

HIGH-FREQUENCY-EXCITED LASER FOR HIGH OUTPUT POWERS, PARTICULARLY A $CO_2$ STRIPLINE LASER

BACKGROUND OF THE INVENTION

The present invention is directed to an HF-excited laser for high input powers, particularly a $CO_2$ stripline laser. A prior art high power waveguide laser is disclosed in U.S. Pat. No. 4,939,738 and a stripline laser is disclosed in U.S. Ser. No. 743,709 filed Aug. 12, 1991.

In HF-excited, higher-power lasers, having for example an input power of at least 1 kW, a matching unit transforms the impedance of the electrons that excite the plasma to the output impedance of the generator, this usually amounting to 50 Ohms at a given frequency. To this end, either two short circuit lines are connected into the input line in $\lambda/4$ spacing or a $\pi$ element having a fixed series inductance and two variable case capacitances were hitherto utilized. However, the short-circuit lines cause high currents and high voltages on the 50 Ohm line, whereas the $\pi$ element has a large physical space requirement.

SUMMARY OF THE INVENTION

It is an object of the present invention to provide a compact structure of a matching element and, simultaneously, to minimize the current load.

The object is achieved by a high-frequency-excited laser of the present invention for high input powers, particularly a $CO_2$ stripline laser, which contains a laser housing and a matching unit integrated in the laser housing for matching the impedance to the impedance of a high-frequency feed. The matching unit contains a L-C element that acts a resonance transformer. The inductance L and capacitance C are variable. The inductance is set on the basis of a variation of the length of the voltaicly conductive parts between an HF feed and an HF conductance of a high-frequency connection. The capacitor is constructed with an outer conductor and an inner conductor coaxial thereto. A coaxial slide ring movable from the outside in an axial direction is in communication with the outer conductor. The slide ring adjoins a dielectric between the outer conductor and the inner conductor. The inner conductor has a capacitor electrode cylinder with an enlarged diameter and the outer conductor carries the inner conductor.

The L-C element in the present invention acts as a resonance transformer at the given frequency. The specific structure guarantees an HF-tight (high-frequency tight) termination of the laser and an HF-tight connection to a high-frequency cable.

Advantageously, the inner conductor forms a region having an enlarged diameter, whereby the capacitance of the capacitor is defined by the axial position of the slide ring vis-a-vis this region.

An optimum exploitation of the space of the existing laser housing is enabled in that the outer conductor is designed coaxially vis-a-vis the laser housing and displaceable relative thereto in an axial direction, in that the inner conductor is insulated from and conducted through a face plate of the outer conductor, in that the inner conductor contains a binder element movable in an axial direction behind this face plate, and in that the axial position of the outer conductor vis-a-vis the housing defines the inductance that is set. The outer conductor thereby advantageously completely surrounds the inner conductor up to a plug-type connection for a coaxial plug and adjoins the housing wall in HF-tight fashion. The laser can thus be simply connected in an HF-tight manner to a connecting cable.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, and in which:

The single FIGURE depicts a high-frequency-excited laser according to the present invention.

DESCRIPTION OF THE PREFERRED EMBODIMENT

A matching unit 2 is accommodated in a laser housing 1. The matching unit 2 is composed of an L-C element, whereby an inductance is formed by the entire length of the HF feed to and conductance from the gas discharge space (not shown in the drawing). The HF feed is fashioned as inner conductor 3 that is composed of an inner plug contact 4, of a pin 5, of a capacitor electrode cylinder 6 and of an inner conductor 7 whose electrically effective length is variable. This HF feed is in communication via a connection element 8 with a laser electrode terminal 9 and is displaceable along the latter in an axial direction.

The end face of the capacitor electrode cylinder 6 is connected to the variable inner conductor 7 and is insulated from a face plate 13 of the outer conductor 10 by an insulating part 12 of plastic, preferably of Teflon and is mechanically supported against this face plate 13. The outer conductor 10 is fashioned displaceable in axial direction along the laser housing 1 and forms a HF-tight termination relative to the laser housing 1.

The face plate 13 is connected to the outer cylinder 14 that projects beyond the capacitor electrode cylinder 6 in axial direction and is completed via an outer plate 17 and an outer tube 24 adjoining thereat. The outer tube 24 has its end region connected to an outside contact ring 25 and is supported against the inner conductor 3 via an insulating washer 26. The outer contact ring 25 serves the purpose of contacting along an outer contact of a coaxial plug (not shown) whose shielded contact contacts the inner plug contact 4 of the inner conductor 3.

A slide ring 27 is arranged displaceable in an axial direction in the outer cylinder 14. The slide ring 27 is supported relative to the outer cylinder 14 via contact springs and is separated from the inner conductor 3 by a dielectric cylinder 28. The dielectric cylinder 28 lies on an insulator flange 19 that is preferably composed of Teflon. The insulator flange 19 surrounds an insulating cylinder 20 that is preferably composed of ceramic and extends to the capacitor electrode cylinder 6. The dielectric cylinder 28 adjoins a stop ring 22 of the insulator part 12, whereby the stop ring 22 serves as a stop for any displacement of the slide ring 27. The slide ring 27 is externally set by displacing the pin 29 in the direction of arrow B. After the balancing, the pin 29 can be fixed along the outer plate 17 and can then be cut off since a readjustment is not provided. After the balancing of the inductance by shifting the entire matching unit 2 in the direction of arrow A, the face plate 13 can be fixed along the laser housing 1.

The insulating cylinder 20 is arranged between the outer plate 17 and the capacitor electrode cylinder 6 in an extension of the outer conductor 24 and, via a sinuous spring 21, the insulating cylinder 20 presses the capacitor electrode cylinder 6 against the insulating part 12 and presses the latter against the face plate 13.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A high-frequency-excited laser for high input powers, particularly a $CO_2$ stripline laser, which contains a laser housing and a matching unit integrated in the housing for matching an impedance of the laser to an impedance of a high-frequency feed connected thereto, comprising: an L-C element in the matching unit, the L-C element acting as a resonance transformer; an inductance and a capacitance of the L-C element being variable; the inductance being set by a variation of a length of voltaicly conductive parts of the high-frequency feed and a high-frequency conductance of a high-frequency connection; the capacitance being provided by a capacitor that is formed by an outer conductor and an inner conductor coaxial thereto; an externally movable coaxial slide ring that is movable in an axial direction being in communication with the outer conductor, said slide ring adjoining a dielectric between the outer conductor and the inner conductor; the inner conductor having a capacitor electrode cylinder with an enlarged diameter; and the outer conductor carrying the inner conductor.

2. The laser according to claim 1, wherein the capacitance of the capacitor is defined by an axial position of the slide ring along the capacitor electrode cylinder.

3. The laser according to claim 1, wherein the matching unit is in a coaxial relationship with the laser housing and displaceable in an axial direction relative to said laser housing; wherein the inner conductor is conducted through a face plate of the outer conductor in an insulated manner; wherein the inner conductor contains a connection element that is adjustable in at least an axial direction behind the face plate; and wherein an axial position of the outer conductor along the laser housing defines the inductance.

4. The laser according to claim 1, wherein the outer conductor completely surrounds the inner conductor up to a plug connection for a coaxial plug, wherein the outer conductor shields the inner conductor in a high-frequency tight manner, and wherein the outer conductor adjoins the laser housing in a high-frequency tight manner.

5. A high-frequency-excited laser for high input powers having a housing and a matching unit integrated in the housing for matching an impedance of the laser to an impedance of a high-frequency feed connected thereto, comprising:
   an L-C element in the matching unit, the L-C element having a variable inductance and a variable capacitance;
   the inductance being set by at least a variation of a length of voltaicly conductive parts of the high-frequency feed;
   the capacitance being provided by a capacitor that is formed by an outer conductor and an inner conductor coaxial thereto with a dielectric between the inner and outer conductors;
   an externally movable coaxial slide ring adjoining the dielectric and in communication with the outer conductor, the slide ring being movable in an axial direction; and
   the inner conductor having a capacitor electrode cylinder with an enlarged diameter and the outer conductor carrying the inner conductor, the inner conductor being a part of the voltaicly conductive parts.

6. The laser according to claim 5, wherein the capacitance of the capacitor is defined by an axial position of the slide ring along the capacitor electrode cylinder.

7. The laser according to claim 5, wherein the matching unit is in a coaxial relationship with the laser housing and and displaceable in an axial direction relative to said laser housing; wherein the inner conductor is conducted through a face plate of the outer conductor in an insulated manner; wherein the inner conductor contains a connection element that is adjustable in at least an axial direction behind the face plate; and wherein an axial position of the outer conductor along the laser housing defines the inductance.

8. The laser according to claim 5, wherein the outer conductor completely surrounds the inner conductor up to a plug connection for a coaxial plug, wherein the outer conductor shields the inner conductor in a high-frequency tight manner, and wherein the outer conductor adjoins the laser housing in a high-frequency tight manner.

9. A high-frequency-excited laser for high input powers having a housing and a matching unit integrated in the housing for matching an impedance of the laser to an impedance of a high-frequency feed connected thereto, comprising:
   an L-C element in the matching unit, the L-C element having a variable inductance and a variable capacitance;
   the inductance being set by at least a variation of a length of voltaicly conductive parts of the high-frequency feed;
   the capacitance being provided by a capacitor that is formed by an outer conductor and an inner conductor coaxial thereto with a dielectric between the inner and outer conductors, the inner conductor being conducted through a face plate of the outer conductor in an insulated manner and the inner conductor having a connection element that is adjustable in at least an axial direction;
   an externally movable coaxial slide ring adjoining the dielectric and in communication with the outer conductor, the slide ring being movable in an axial direction;
   the inner conductor having a capacitor electrode cylinder with an enlarged diameter and the outer conductor carrying the inner conductor, the capacitor electrode cylinder being a part of the voltaicly conductive parts;
   the capacitance being defined by an axial position of the slide ring along the capacitor electrode cylinder; and
   the inductance being defined by an axial position of the outer conductor along the housing of the laser.

10. The laser according to claim 9, wherein the outer conductor completely surrounds the inner conductor up to a plug connection for a coaxial plug, wherein the outer conductor shields the inner conductor in a high-frequency tight manner, and wherein the outer conductor adjoins the laser housing in a high-frequency tight manner.

* * * * *